(12) United States Patent
Yamasaki et al.

(10) Patent No.: US 9,774,397 B2
(45) Date of Patent: Sep. 26, 2017

(54) GUIDANCE DISPLAY, GUIDANCE SYSTEM, AND GUIDANCE METHOD

(71) Applicant: Panasonic Intellectual Property Management Co., Ltd., Osaka (JP)

(72) Inventors: Shigeaki Yamasaki, Osaka (JP); Masaaki Ikehara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/249,659

(22) Filed: Aug. 29, 2016

(65) Prior Publication Data

US 2017/0063456 A1    Mar. 2, 2017

(30) Foreign Application Priority Data

Sep. 1, 2015 (JP) .................................. 2015-172404

(51) Int. Cl.
*H04B 10/116* (2013.01)
*G06K 9/00* (2006.01)
*G01C 21/36* (2006.01)

(52) U.S. Cl.
CPC ....... *H04B 10/116* (2013.01); *G01C 21/3667* (2013.01); *G06K 9/00671* (2013.01)

(58) Field of Classification Search
CPC .................................................... H04B 10/116
See application file for complete search history.

(56) References Cited

U.S. PATENT DOCUMENTS

2016/0277106 A1\*  9/2016  Cha ....................... H04B 10/116

FOREIGN PATENT DOCUMENTS

JP         2005-180967      \*   7/2005   ............. G01C 21/00
JP         2012-055582           3/2012

\* cited by examiner

*Primary Examiner* — Shi K Li
(74) *Attorney, Agent, or Firm* — Renner Otto Boiselle & Sklar, LLP

(57) ABSTRACT

Provided is a guidance display device which transmits predetermined information by visible light communications, the guidance display device including: a light source which emits light for visible light communications, the light including the predetermined information; a housing covering the light source and having a first light-exit surface which transmits the light emitted by the light source; a first guidance display on the first light-exit surface; and a first mark on the first light-exit surface, wherein the first mark has a shape corresponding to a total number of light-exit surfaces, including the first light-exit surface, of the guidance display device through which the light for visible light communications emitted by the light source exits.

14 Claims, 13 Drawing Sheets

FIG. 5

| VISIBLE LIGHT ID | LOCATION | FIRST MARK | | SECOND MARK | | THIRD MARK | | FOURTH MARK | |
|---|---|---|---|---|---|---|---|---|---|
| | | SHAPE AND ORIENTATION | DIRECTION | SHAPE AND ORIENTATION | DIRECTION | SHAPE AND ORIENTATION | DIRECTION | SHAPE AND ORIENTATION | DIRECTION |
| VL001 | UNDERGROUND MALL 001 | UPPER HALF CIRCLE | NORTH | LOWER HALF CIRCLE | SOUTH | — | — | — | — |
| VL002 | UNDERGROUND MALL 002 | UP-TRIANGLE | NORTH | DOWN-TRIANGLE | SOUTH | — | — | — | — |
| VL003 | UNDERGROUND MALL 003 | UPPER-LEFT SECTOR | NORTH | LOWER-LEFT SECTOR | WEST | UPPER-RIGHT SECTOR | EAST | LOWER-RIGHT SECTOR | SOUTH |
| ... | ... | ... | ... | ... | ... | ... | ... | ... | ... |

32

GUIDANCE DISPLAY, GUIDANCE SYSTEM, AND GUIDANCE METHOD

CROSS REFERENCE TO RELATED APPLICATION

This application claims the benefit of priority of Japanese Patent Application Number 2015-172404, filed Sep. 1, 2015, the entire content of which is hereby incorporated by reference.

BACKGROUND

1. Technical Field

The present disclosure relates to a guidance display device, a guidance system, and a guidance method which utilize visible light communications.

2. Description of the Related Art

Conventionally, systems which utilize visible light communications to provide directions are known. For example, Japanese Unexamined Patent Application Publication No. 2012-55582 discloses an assistance system for the visually-impaired, in which a cane having visible light communications capabilities receives guidance and alert from a light.

SUMMARY

When utilizing visible light communications to guide a user, a system receives visible light and, based on the visible light, identifies the location of an illumination device or the like which is a source of the visible light, thereby knowing a current location of the user. However, despite knowing the current location of the user, the system is unable to know a direction where the user is located relative to the illumination device. For this reason, even if the system provides the user with a route from the current location to a destination, the user may end up proceeding in a direction opposite the destination.

Thus, an object of the present disclosure is to provide a guidance display device, a guidance system, and a guidance method which guide a user properly.

In order to achieve the above object, a guidance display device according to one aspect of the present disclosure transmits predetermined information by visible light communications, the guidance display device including: a light source which emits light for visible light communications, the light including the predetermined information; a housing covering the light source and having a first light-exit surface which transmits the light emitted by the light source; a first guidance display on the first light-exit surface; and a first mark on the first light-exit surface, wherein the first mark has a shape corresponding to a total number of light-exit surfaces, including the first light-exit surface, of the guidance display device through which the light for visible light communications emitted by the light source exits.

A guidance system according to one aspect of the present disclosure includes the guidance display device and a mobile device, the mobile device including: a capturer which obtains an image containing the first mark and receives the light for visible light communications, by capturing a video of the first light-exit surface; a first controller which extracts the predetermined information from the light received by the capturer, and generates design information based on the shape of the first mark from the image; a receiver which receives input of a destination from a user; a first communications circuit which transmits to a server device a guidance request which includes the predetermined information, the design information, and destination information indicative of the destination, and receives guidance information from the server device as a response to the guidance request, the guidance information being information for guiding the user to the destination; and an output which outputs the guidance information.

A guidance method according to one aspect of the present disclosure is performed using the guidance display device, the guidance method including: obtaining an image containing the first mark and receiving the light for visible light communications, by capturing a video of the first light-exit surface; extracting the predetermined information from the light; generating design information based on the shape of the first mark from the image; receiving input of a destination from a user; determining a current location of the user, based on the predetermined information and the design information; generating guidance information which indicates a route from the current location to the destination; and outputting the guidance information.

According to the guidance display device, etc. of the present disclosure, a user is guided properly.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 5 is a diagram illustrating an example of a correspondence table according to the embodiment;

DETAILED DESCRIPTION OF EMBODIMENTS

Hereinafter, a guidance display device, a guidance system, and a guidance method according to embodiments of the present disclosure are described with reference to the accompanying drawings. The embodiments described below are each merely one specific example of the present disclosure. Thus, values, shapes, materials, components, and arrangement and connection between the components, and steps and order of the steps shown in the following embodiments are merely by way of illustration and not intended to limit the present disclosure. Therefore, among the components in the embodiments below, components not recited in any one of the independent claims defining the most generic part of the inventive concept of the present disclosure are described as arbitrary components.

The figures are schematic illustration and do not necessarily illustrate the present disclosure precisely. In the figures, the same reference sign is used to refer to the same component.

Embodiment

Outline of Guidance System

Figure 1:
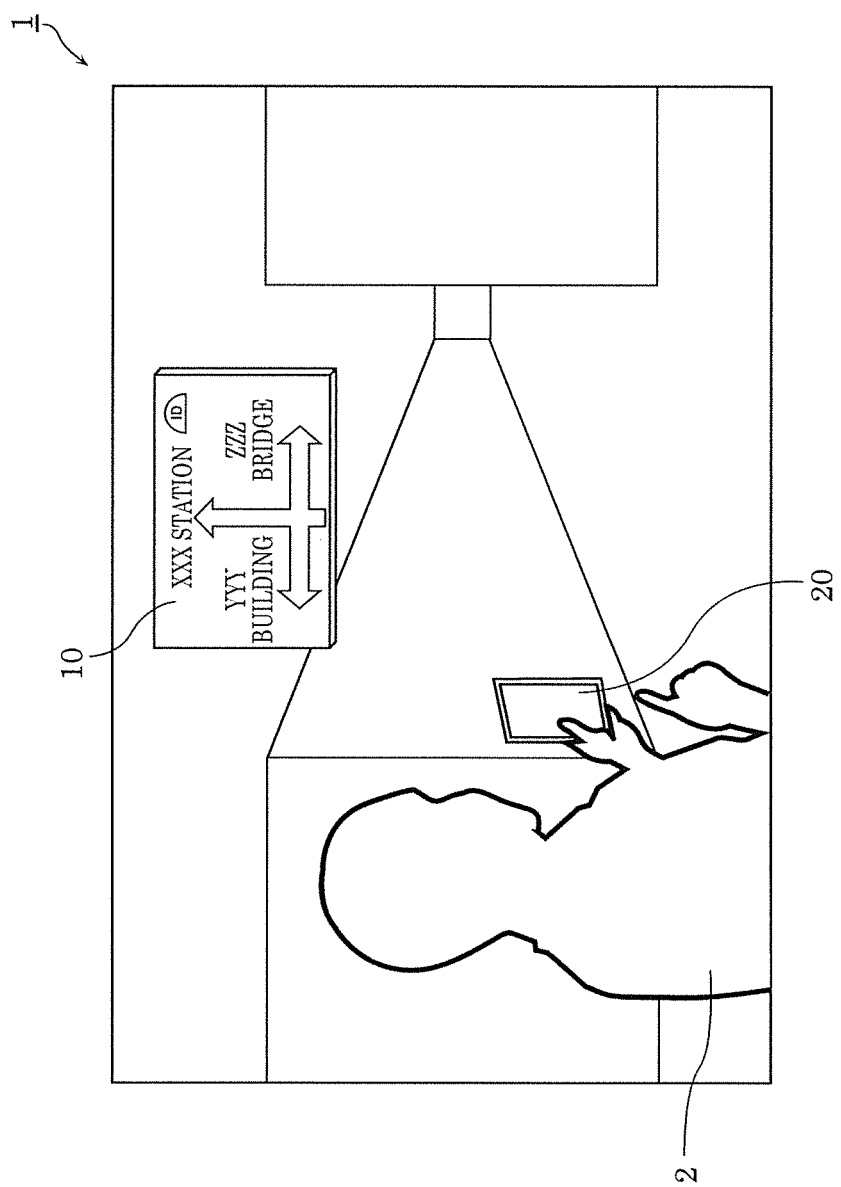
FIG. 1 is a schematic view of an example of an application of a guidance system according to an embodiment.
Figure 2:
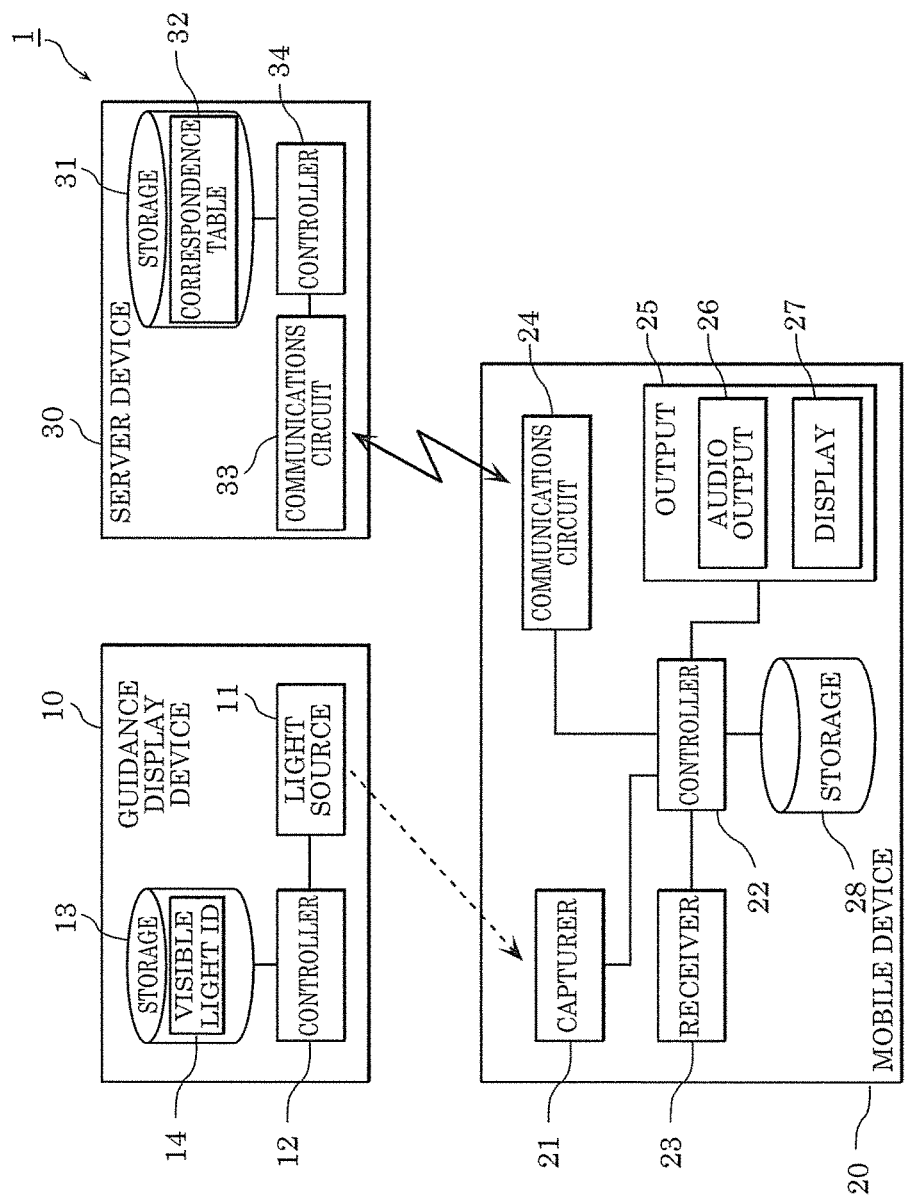
FIG. 2 is a block diagram illustrating functional configuration of the guidance system according to the embodiment.

First, an outline of a guidance system according to the present embodiment is described with reference to FIGS. 1 and 2. FIG. 1 is a schematic view of an example of an application of guidance system 1 according to the present embodiment. FIG. 2 is a block diagram illustrating functional configuration of guidance system 1 according to the present embodiment.

Guidance system 1 uses visible light communications to guide user 2 to a destination. As shown in FIG. 1, guidance system 1 includes guidance display device 10 and mobile device 20. In the present embodiment, as shown in FIG. 2, guidance system 1 further includes server device 30.

Guidance display device 10 transmits predetermined information by visible light communications. In other words, guidance display device 10 is the source of light for visible light communications which includes the predetermined information. Guidance display device 10 is installed indoors such as an interior of a building or an underground mall (underground passage). As shown in FIG. 1, guidance display device 10 is, for example, a guidance display board mounted on the ceiling of an underground passage, and functions also as an illumination device. It should be noted that guidance display device 10 may be installed outdoors.

Guidance display device 10 is, for example, a lighting apparatus such as a signage light. Alternatively, guidance display device 10 may be a video display device such as a digital signage.

Mobile device 20 performs visible light communications with guidance display device 10. Specifically, mobile device 20 receives visible light emitted by guidance display device 10, and obtains a current location of mobile device 20, based on information included in the visible light. Mobile device 20 outputs guidance information which is information for guiding user 2 from the current location to a destination.

Mobile device 20 is a mobile information terminal such as a mobile phone, smart phone, tablet, etc. Alternatively, mobile device 20 may be anything that user 2 carries, examples of which include a wearable terminal such as a smart watch, and a white cane for a visually impaired person.

Server device 30 performs wireless communications with mobile device 20. Server device 30 receives a guidance request from mobile device 20 and transmits guidance information to mobile device 20 as a response to the guidance request. Server device 30 may also function as a management device in guidance system 1 and provide mobile device 20 with an execution program (application) of guidance system 1, for example. Server device 30 is, for example, a computer or the like.

In the following, the components included in guidance system 1 are described in detail.

Guidance Display Device

First, guidance display device 10 is described with reference to FIGS. 3 and 4, besides FIG. 2.

Figure 3:
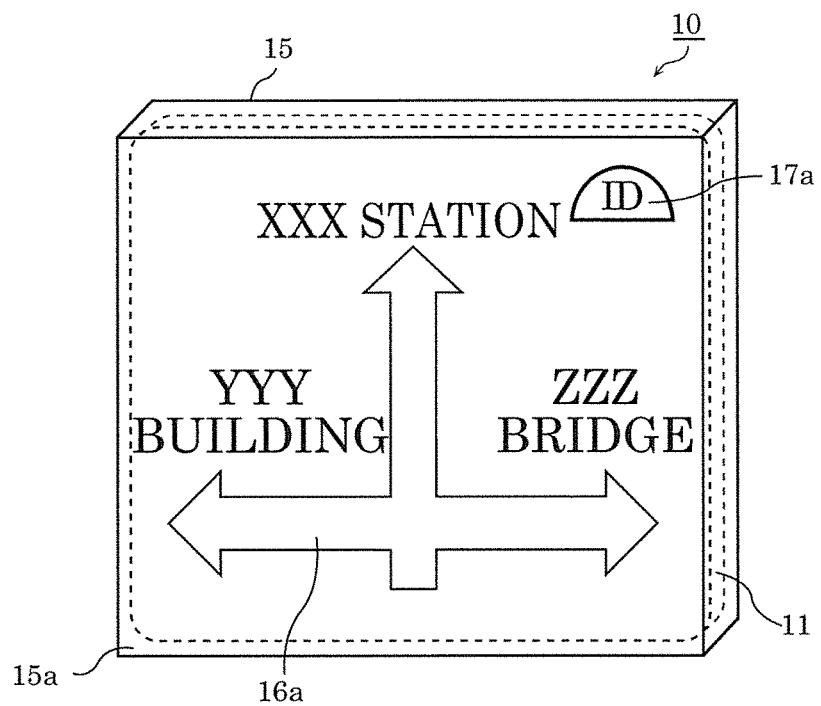
FIG. 3 is a first light-exit surface side external view of a guidance display device according to the embodiment.

FIG. 3 is a first light-exit surface 15a side external view of guidance display device 10 according to the present embodiment. FIG. 4 is a second light-exit surface 15b side external view of guidance display device 10 according to the present embodiment.

Figure 4:
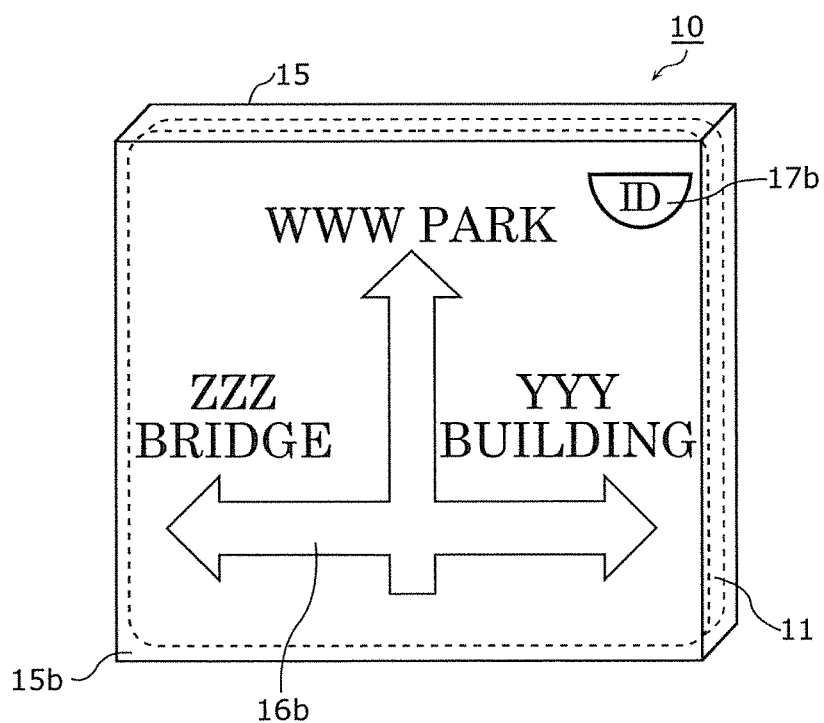
FIG. 4 is a second light-exit surface side external view of the guidance display device according to the embodiment.

As shown in FIGS. 3 and 4, guidance display device 10 includes light source 11, housing 15, first guidance display 16a, second guidance display 16b, first mark 17a, and second mark 17b. As shown in FIG. 2, guidance display device 10 further includes controller 12 and storage 13. Storage 13 is storing visible light ID 14.

Light source 11 emits the light for visible light communications which includes the predetermined information. In the present embodiment, the predetermined information is identification information unique to guidance display device 10. The unique identification information is, specifically, visible light ID 14 stored in storage 13. Visible light ID 14 is identification information such as a serial number pre-assigned to guidance display device 10, or location information indicating a location at which guidance display device 10 is installed. The light for visible light communications is, specifically, visible light (illumination light) having visible light ID 14 superimposed thereon.

Light source 11, for example, includes a plurality of light emitting diodes (LED) connected in series. The visible light (illumination light) emitted by light source 11 is, but not particularly limited to, white light, for example. By emitting the illumination light, light source 11 repeatedly transmits visible light ID 14 superimposed on the illumination light.

Light source 11, for example, transmits a frame which includes visible light ID 14 repeatedly at regular intervals. Each frame is fixed-length data which includes a preamble indicating the beginning of the frame, type information indicating a type of the frame, payload indicating arbitrary information (here, visible light ID 14), and error detection code (e.g., cyclic redundancy check (CRC) code) of the frame.

Controller 12 controls light source 11. Controller 12 includes a non-volatile memory storing a program, a volatile memory which is a temporary storage area for executing the program, an input-output port, a processor which executes the program, etc. Controller 12 is, for example, a microcontroller.

In the present embodiment, controller 12 superimposes visible light ID 14 on the illumination light. For example, controller 12 controls turning on and off of at least one of the plurality of LEDs included in light source 11. This changes an amount of current through the plurality of LEDs, causing variations in brightness of the illumination light. Controller 12 uses visible light ID 14 read out from storage 13 to control turning on and off of the at least one LED, thereby transmitting visible light ID 14 in a form of the variations in brightness of the illumination light. In other words, visible light ID 14 is superimposed on the illumination light.

Specifically, controller 12 uses N (an integer equal to or greater than 2) pulse position modulation (PPM) as light intensity modulation. For example, in 4 PPM, one symbol having a certain length in time represents two bits. The modulation method and others used for the visible light communications are standardized, for example, by CP-1223 "Visible Light Beacon System" by the Japan Electronics and Information Technology Industries Association (JEITA).

Storage 13 is a memory storing visible light ID 14. Storage 13 is, for example, a non-volatile memory such as flash memory.

Housing 15 covers light source 11 and has first light-exit surface 15a which transmits the light from light source 11. As shown in FIGS. 3 and 4, housing 15 further has second light-exit surface 15b which transmits the light from light source 11. In the present embodiment, housing 15 is a sign (panel-shaped) housing. First surface 15a and second light-exit surface 15b are opposing surfaces of housing 15. Light source 11, controller 12, and storage 13 are accommodated in housing 15, and the light from light source 11 exits housing 15 from first light-exit surface 15a and second light-exit surface 15b.

Housing 15 is formed of a light-transmissive resin material such as acrylic (PMMA) and polycarbonate (PC), for example. It should be noted that portions (e.g., side surfaces of housing 15) other than first light-exit surface 15a and second light-exit surface 15b of housing 15 may not be light transmissive and thus may be formed of, for example, a light-proof metallic material such as aluminum.

First guidance display 16a is a guidance display on first light-exit surface 15a. Second guidance display 16b is a guidance display on second light-exit surface 15b. The guidance displays are signs indicating a direction leading to a predetermined place or the like for providing user 2 with directions. Examples of the predetermined place include landmarks such as stations, parks, and buildings, and administrative districts of municipalities and prefectures. First guidance display 16a and second guidance display 16b may be printed on first light-exit surface 15a and second light-exit surface 15b, respectively. Alternatively, first guidance display 16a and second guidance display 16b may be plastic films or papers that have an adhesive material on the back, such as stickers and labels.

First guidance display 16a displays on the upper side a name of a landmark (e.g., "XXX STATION") present in the heading of user 2 so as to make intuitive sense to user 2 as he/she looks at guidance display device 10 from the first light-exit surface 15a side. Likewise, second guidance display 16b displays on the upper side a name of a landmark (e.g., "WWW PARK") present in the heading of user 2 so as to make intuitive sense to user 2 as he/she looks at guidance display device 10 from the second light-exit surface 15b side. Since first light-exit surface 15a and second light-exit surface 15b are opposing surfaces, first guidance display 16a and second guidance display 16b have a relationship in which they are vertically and horizontally reversed from each other.

First mark 17a is on first light-exit surface 15a. First mark 17a indicates, for example, that the light which exits housing 15 from first light-exit surface 15a is the light for visible light communications. First mark 17a has a shape corresponding to a total number of light-exit surfaces of guidance display device 10 through which the light for visible light communications exits. Specifically, as shown in FIG. 3, first mark 17a is shaped in an upper half circle. While first mark 17a is provided on the upper right corner of first light-exit surface 15a in the present embodiment, a position where first mark 17a is provided on first light-exit surface 15a is not particularly limited.

Second mark 17b is on second light-exit surface 15b. Second mark 17b indicates, for example, that the light which exits housing 15 from second light-exit surface 15b is the light for visible light communications. Second mark 17b has a shape corresponding to the total number of light-exit surfaces of guidance display device 10 through which the light for visible light communications exits. Specifically, as shown in FIG. 4, second mark 17b is shaped in a lower half circle. While second mark 17b is provided on the upper right corner of second light-exit surface 15b in the present embodiment, where a position where second mark 17b is provided on second light-exit surface 15b is not particularly limited.

In the present embodiment, housing 15 has two light-exit surfaces through which the light for visible light communications exits. Stated differently, the light for visible light communications exits housing 15 from first light-exit surface 15a and second light-exit surface 15b. A total number of light-exit surfaces is equal to a total number of guidance displays (a total number of guidance display surfaces).

In the present embodiment, the shapes of first mark 17a and second mark 17b are identical but have different orientations. In other words, the shapes of first mark 17a and second mark 17b are congruent and have different orientations. In other words, as one of the shape of first mark 17a and the shape of second mark 17b is rotated, it overlaps with the other.

As described above, first mark 17a and second mark 17b have shapes which correspond to a total number of light-exit surfaces in accordance with a predefined criterion. The shapes of first mark 17a and second mark 17b correspond to the total number of geometric segments that combine to form an overall geometric shape, in this case, a circular shape. To be more specific, first mark 17a and second mark 17b are two segments into which a circle is segmented by 2 which is the total number of guidance display surfaces.

First mark 17a and second mark 17b may be printed on first light-exit surface 15a and second light-exit surface 15b, respectively. Alternatively, first mark 17a and second mark 17b may be plastic films or papers that have an adhesive material on the back, such as stickers and labels.

The shapes of the marks are to be described in detail below.

Mobile Device

Next, mobile device 20 is described with reference to FIG. 2.

As shown in FIG. 2, mobile device 20 includes capturer 21, controller 22, receiver 23, communications circuit 24, output 25, and storage 28.

Capturer 21 obtains an image containing a mark and receives the light for visible light communications by capturing a video of a guidance display surface of guidance display device 10. For example, when user 2 is positioned facing first light-exit surface 15a of guidance display device 10, capturer 21 obtains an image containing first mark 17a by capturing a video of first light-exit surface 15a. When user 2 is positioned facing second light-exit surface 15b of guidance display device 10, capturer 21 obtains an image containing second mark 17b by capturing a video of second light-exit surface 15b.

Capturer 21, for example, includes a lens, an image sensor, etc. Capturer 21 outputs captured video data to controller 22. The video data includes the image containing the mark and the light for visible light communications.

Controller 22 is, by way of example, a first controller which extracts visible light ID 14 from the light which capturer 21 has received, and generates design information based on a design including a shape and orientation of the mark from the image. Specifically, controller 22 extracts visible light ID 14 by demodulating the light (light signal) for visible light communications that is included in the video data output from capturer 21.

In the present embodiment, controller 22 performs an image recognition process on the image to determine a shape of the mark, and generates a determination result as design information. Examples of the image recognition process include edge detection and pattern-matching. For example, controller 22 extracts one frame image containing the mark from the video data output from capturer 21 and, for example, performs edge detection on the image, thereby determining a shape and orientation of the mark.

The determination result is, specifically, information indicating the shape and orientation of the mark. For example, the determination result is information indicating that the mark is shaped in an upper half circle or a lower half circle. Alternatively, the determination result may be information indicating the captured mark. Since the shape and orientation of a mark are associated with a surface on which the mark is provided, the determination result may be information indicating a surface on which the mark is provided.

For example, if capturer 21 captures a video of first mark 17a, controller 22 determines that the mark is shaped in an upper half circle by the image recognition process. As design information, controller 22 generates, for example, information indicating that the mark is shaped in an upper half circle, information indicating that the captured mark is first mark 17a, or information indicating that the captured video includes first light-exit surface 15a.

Controller 22 transmits visible light ID 14 and the design information to server device 30 via communications circuit 24. Moreover, controller 22 transmits destination information, which is output from receiver 23, to server device 30 via communications circuit 24.

Controller 22 controls the components which constitute mobile device 20. Controller 22 includes a non-volatile memory storing a program, a volatile memory which is a temporary storage area for executing the program, an input-output port, a processor which executes the program, etc.

Receiver 23 is a user interface which receives manipulation from user 2. Receiver 23 receives input of a destination from user 2. Receiver 23 outputs to controller 22 destination information indicating the destination input by user 2. Receiver 23 may further receive from user 2 an indication directed to capturer 21 to capture a video and an indication for launching a guidance program, for example.

Receiver 23 is, for example, a touch-panel display. Alternatively, receiver 23 may be physical buttons on the housing of mobile device 20. Receiver 23 may include audio input means such as a microphone.

Communications circuit 24 is, by way of example, a first communications circuit. Communications circuit 24 transmits the guidance request to server device 30. The guidance request includes destination information which indicates the destination, visible light ID 14, and the design information. The guidance request may further include identification information that is unique to and for identifying mobile device 20.

Communications circuit 24 receives the guidance information, which is information for guiding user 2 to the destination, from server device 30 as a response to the guidance request. The guidance information, specifically, includes a map showing at least a portion of a route from the current location of mobile device 20 to the destination. Examples of the map include not only road maps, topographic maps, etc., but also floor maps. Alternatively, the guidance information may be audio guidance which guides the route from the current location to the destination.

Communications circuit 24 is, for example, a communications interface such as a transceiver and antenna for wireless communications. Communications circuit 24 performs wireless communications with communications circuit 33 included in server device 30. The wireless communication is based on a wireless communication standard, such as Wi-Fi or long term evolution (LTE), for example.

Output 25 outputs the guidance information. As shown in FIG. 2, output 25 includes audio output 26 and display 27.

Audio output 26 outputs audio guidance included in the guidance information. Audio output 26 is, for example, a loudspeaker.

Display 27 displays the map included in the guidance information. Display 27 is, for example, a touch-panel display.

Storage 28 is a memory for storing the execution program of guidance system 1, etc. For example, storage 28 may store the video data captured by capturer 21. Alternatively, storage 28 may store, for example, visible light ID 14, the design information, etc. Also, storage 28 may store the guidance information transmitted from server device 30.

Storage 28 is, for example, a non-volatile memory such as flash memory.

Server Device

Next, server device 30 is described with reference to FIG. 2.

As shown in FIG. 2, server device 30 includes storage 31, communications circuit 33, and controller 34.

Storage 31 stores correspondence table 32. Storage 31 is, for example, a non-volatile memory, such as a hard disk drive (HDD), flash memory, etc.

In correspondence table 32, the predetermined information, the location of the guidance display device, the shape of the mark, and a direction that the guidance display surface is facing are associated with one another. FIG. 5 is a diagram illustrating an example of correspondence table 32 according to the present embodiment.

As illustrated in FIG. 5, for each visible light ID, the installed location of guidance display device 10 corresponding to the visible light ID and one or more marks on that guidance display device 10 are associated in correspondence table 32. In the example illustrated in FIG. 5, each visible light ID is associated with a first mark, a second mark, a third mark, and a fourth mark. The first to fourth marks are each associated with its shape and orientation, and a direction that a surface on which the mark is provided is facing.

For example, correspondence table 32 illustrated in FIG. 5 indicates that a guidance display device assigned a visible light ID of "VL001" is installed at a location indicated by "UNDERGROUND MALL 001." It should be noted that "UNDERGROUND MALL 001" is, by way of example, location information indicating the location of the guidance display device on the map, for example. Further, in correspondence table 32, it is indicated that the guidance display device assigned "VL001" is marked with a first mark and a second mark where the first mark is shaped in an "UPPER HALF CIRCLE" and provided on the north-facing surface of the guidance display device, and the second mark is shaped in a "LOWER HALF CIRCLE" and provided on the south-facing surface of the guidance display device.

Communications circuit 33 is, by way of example, a second communications circuit. Communications circuit 33 receives the guidance request. Communications circuit 33 further transmits the guidance information to mobile device 20 as a response to the guidance request.

Communications circuit 33 is, for example, a communications interface such as a transceiver and antenna for wireless communications. Communications circuit 33 performs wireless communication with communications circuit 24 included in mobile device 20. The wireless communication is based on a wireless communication standard, such as Wi-Fi or LTE, for example.

Controller 34 is, by way of example, a second controller. Controller 34 determines a current location of mobile device 20 from the predetermined information and the design information included in the guidance request, by reference to correspondence table 32. Controller 34 generates, as guidance information, information indicating a route from the current location to a destination indicated by the destination information.

For example, if received a guidance request which includes a visible light ID of "VL002," controller 34 knows that guidance display device 10 is located at "UNDERGROUND MALL 002," by reference to correspondence table 32. Stated differently, controller 34 knows that user 2 of mobile device 20 which has transmitted the guidance request is at or near "UNDERGROUND MALL 002," that is, controller 34 knows an approximate current location of user 2.

If the design information included in the guidance request indicates "DOWN-TRIANGLE," controller 34 knows that user 2 has taken a video of guidance display device 10 from the "SOUTH", by reference to correspondence table 32 illustrated in FIG. 5. In other words, controller 34 knows that user 2 is located on "SOUTH" side of guidance display device 10, looking at guidance display device 10, that is, controller 34 knows that user 2 is facing the "NORTH."

This allows controller 34 to know the current location of user 2 and the direction that user 2 is facing. Controller 34 prepares a map from the current location to the destination, using the destination information included in the guidance request. It should be noted that the map is, for example, stored in storage 31. Controller 34 transmits the prepared map in guidance information to mobile device 20 via communications circuit 33.

It should be noted that controller 34 may not transmit the map as is. Controller 34 may instead generate as the guidance information and transmit address information indicating the map such as uniform resource locator (URL).

It should be noted that storage 31 may store history information for each user 2 (mobile device 20). The history information includes, for example, time information indicating time and date when the guidance request is transmitted from mobile device 20, the destination information included in the guidance request, and the information on the current location of mobile device 20 that has been determined by controller 34 based on the design information included in the guidance request.

This allows server device 30 to know, for each user, when and where the user is present and where the user is heading to. This allows server device 30, for example, to estimate a status of attendance of customers to a certain facility (destination). For example, understanding the status of attendance of customers to a stadium where sports games and concerts are held can be utilized to revise stadium security, for example.

Mark Shape

Here, a shape of a mark made on a guidance display surface of guidance display device 10 according to the present embodiment is described.

The mark according to the present embodiment has a shape corresponding to a total number of light-exit surfaces of guidance display device 10 through which the light for visible light communications exits. Stated differently, the mark has a shape corresponding to the total number of guidance display surfaces of guidance display device 10. Specifically, the mark has a shape that allows user 2 to guess the total number of guidance display surfaces of guidance display device 10 by looking at the shape.

In the following, specific examples of shapes of marks are described with reference to FIGS. 6A to 6D.

Figure 6A:
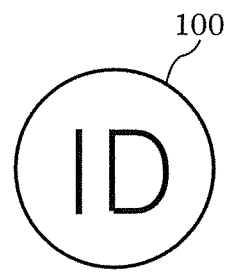
FIG. 6A is a diagram illustrating an example of a mark made on a guidance display surface when the guidance display device according to the embodiment has one guidance display surface.
Figure 6B:
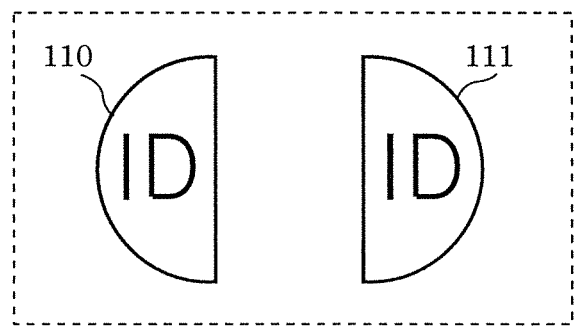
FIG. 6B is a diagram illustrating an example of marks made on guidance display surfaces when the guidance display device according to the embodiment has two guidance display surfaces.
Figure 6C:
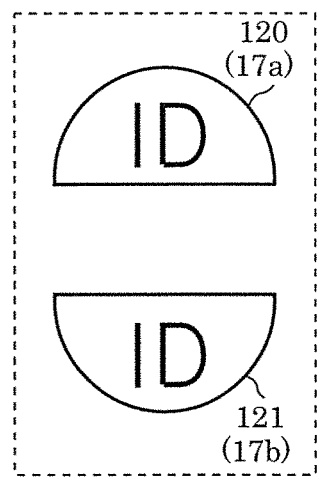
FIG. 6C is a diagram illustrating an example of marks made on guidance display surfaces when the guidance display device according to the embodiment has two guidance display surfaces.
Figure 6D:
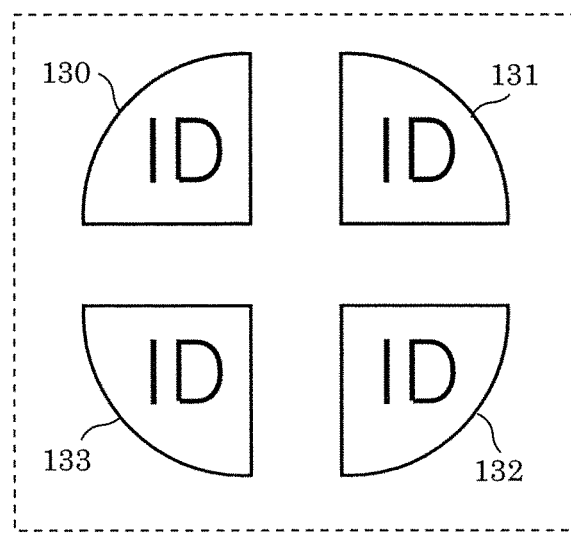
FIG. 6D is a diagram illustrating an example of marks made on guidance display surfaces when the guidance display device according to the embodiment has four guidance display surfaces.

FIG. 6A is a diagram illustrating mark 100 made on a guidance display surface when guidance display device 10 according to the present embodiment has one guidance display surface. FIGS. 6B and 6C are diagrams illustrating marks 110 and 111 and marks 120 and 121, respectively, made on guidance display surfaces when guidance display device 10 according to the present embodiment has two guidance display surfaces. FIG. 6D is a diagram illustrating marks 130, 131, 132, and 133 made on guidance display surfaces when guidance display device 10 according to the present embodiment has four guidance display surfaces.

Mark 100 illustrated in FIG. 6A is one example of a rotationally symmetric graphic, specifically, a circle. Since mark 100 is shaped in a circle, user 2 sensuously perceives it as one complete shape, namely, a symmetric shape without being segmented.

The shape and orientation of mark 110 and the shape and orientation of mark 111 illustrated in FIG. 6B, on the other hand, are the shape and orientation of a first segment and the shape and orientation of a second segment, respectively, the first segment and the second segment being included in a plurality of segments into which a graphic having a specific shape is segmented. The graphic having a specific shape is, for example, a rotationally symmetric graphic. In the example illustrated in FIG. 6B, the graphic having a specific shape is a circle. Stated differently, the graphic having a specific shape refers to a shape of a mark made on a guidance display surface when the guidance display device has one guidance display surface, as illustrated in FIG. 6A.

Mark 110 (first segment) and mark 111 (second segment) are shaped in half circles into which a circular graphic is segmented equally left and right. Specifically, mark 110 is shaped in a left half circle, and mark 111 is shaped in a right half circle.

Likewise, mark 120 (first segment) and mark 121 (second segment) illustrated in FIG. 6C are shaped in half circles into which a circular graphic is segmented equally top and bottom. Mark 120 is shaped in an upper half circle, and mark 121 is shaped in a lower half circle.

Marks 130 to 133 illustrated in FIG. 6D are shaped in quarter circles into which a circular graphic is segmented equally about the centroid of the circle. Mark 130 (first segment) is shaped in an upper-left quarter circle, and mark 131 (second segment) is shaped in an upper-right quarter circle. Mark 132 (third segment) is shaped in a lower-right quarter circle, and mark 133 (fourth segment) is shaped in a lower-left quarter circle. While the description has been given with reference to the vertical and horizontal parting lines in the example illustrated in FIG. 6D, it should be noted that the parting lines may be oblique.

Moreover, the graphic having a specific shape, namely, the mark made on the guidance display surface when the guidance display device has one guidance display surface, is not limited to a circle, and may be, for example, a rhombus.

Figure 7A:
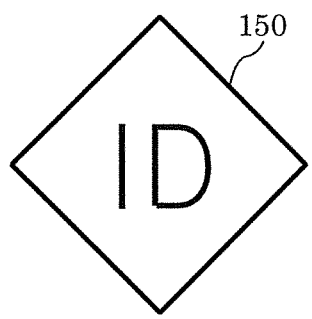
FIG. 7A is a diagram illustrating another example of a mark made on a guidance display surface when the guidance display device according to the embodiment has one guidance display surface.
Figure 7B:
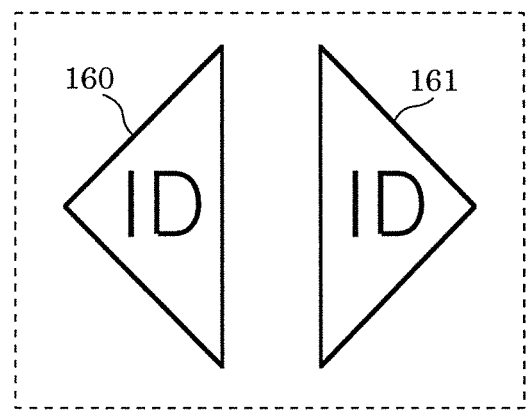
FIG. 7B is a diagram illustrating another example of marks made on guidance display surfaces when the guidance display device according to the embodiment has two guidance display surfaces.
Figure 7C:
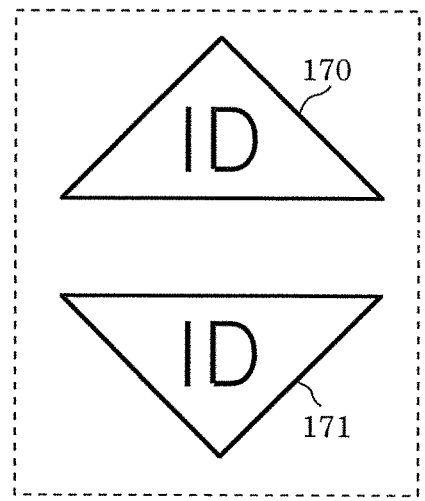
FIG. 7C is a diagram illustrating still another example of marks made on guidance display surfaces when the guidance display device according to the embodiment has two guidance display surfaces.
Figure 7D:
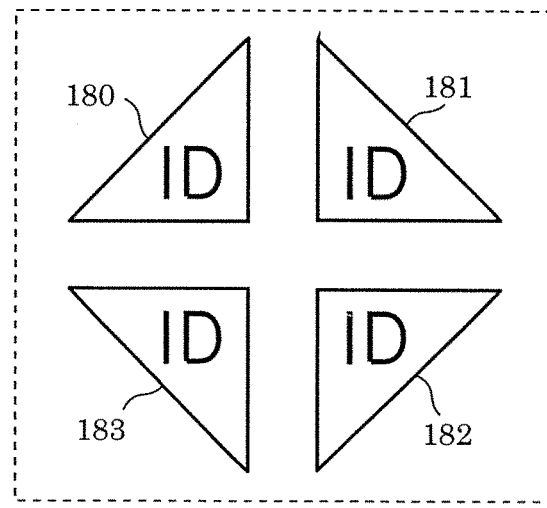
FIG. 7D is a diagram illustrating another example of marks made on guidance display surfaces when the guidance display device according to the embodiment has four guidance display surfaces.

FIG. 7A to 7D are diagrams illustrating another examples of the marks made on the light-exit surfaces of guidance display device 10 according to the present embodiment. Specifically, FIG. 7A is a diagram illustrating mark 150 made on a guidance display surface when guidance display device 10 according to the present embodiment has one guidance display surface. FIGS. 7B and 7C are diagrams illustrating marks 160 and 161 and marks 170 and 171, respectively, made on guidance display surfaces when guidance display device 10 according to the present embodiment has two guidance display surfaces. FIG. 7D is a diagram illustrating marks 180, 181, 182, and 183 made on guidance display surfaces when guidance display device 10 according to the present embodiment has four guidance display surfaces.

Mark 150 illustrated in FIG. 7A is one example of a rotationally symmetric graphic, specifically, a rhombus or square. Since mark 150 is shaped in a rhombus or square, user 2 sensuously perceives it as one complete shape, namely, a symmetric shape without being segmented.

The shape and orientation of mark 160 and the shape and orientation of mark 161 illustrated in FIG. 7B, on the other hand, are the shape and orientation of a first segment and the shape and orientation of a second segment, respectively, the first segment and the second segment being included in a plurality of segments into which a graphic having a specific shape is segmented. The graphic having a specific shape is, for example, a rotationally symmetric graphic. In the example illustrated in FIG. 7B, the graphic having a specific shape is a rhombus.

Mark 160 (first segment) and mark 161 (second segment) are shaped in two triangles into which a rhombus graphic is segmented equally left and right. Specifically, mark 160 is shaped in a left half triangle (specifically, an isosceles triangle), and mark 161 is shaped in a right half triangle (specifically, an isosceles triangle).

Likewise, mark 170 (first segment) and mark 171 (second segment) illustrated in FIG. 7C are shaped in half circles into which a rhombus graphic is segmented equally top and bottom. Mark 170 is shaped in an upper half triangle (specifically, an isosceles triangle), and mark 171 is shaped in a lower half triangle (specifically, an isosceles triangle).

Marks 180 to 183 illustrated in FIG. 7D are shaped in four triangles into which a rhombus graphic is segmented equally about the centroid of the rhombus. Mark 180 (first segment) is shaped in an upper-left isosceles triangle, and mark 181 (second segment) is shaped in an upper-right isosceles triangle. Mark 182 (third segment) is shaped in a lower-right isosceles triangle, and mark 183 (fourth segment) is shaped in a lower-left isosceles triangle. While the description has been given with reference to the vertical and horizontal parting lines in the example illustrated in FIG. 7D, it should be noted that the parting lines may be oblique.

Thus, in the present embodiment, the total number of guidance display surfaces (i.e., light-exit surfaces) of guidance display device 10 is indicated by a number that a graphic having a specific shape is segmented into. Thus, user 2 is able to guess whether guidance display device 10 has another guidance display by visually identifying a mark made on a guidance display surface.

For example, when user 2 identifies mark 100 illustrated in FIG. 6A, user 2 can be expected to perceive mark 100 as being shaped in a circle which is a symmetric shape without being segmented. This can thus make user 2 guess that guidance display device 10 does not have any other guidance display surface, thereby prompting user 2 to launch the execution program of guidance system 1 according to the present embodiment.

Figure 8:
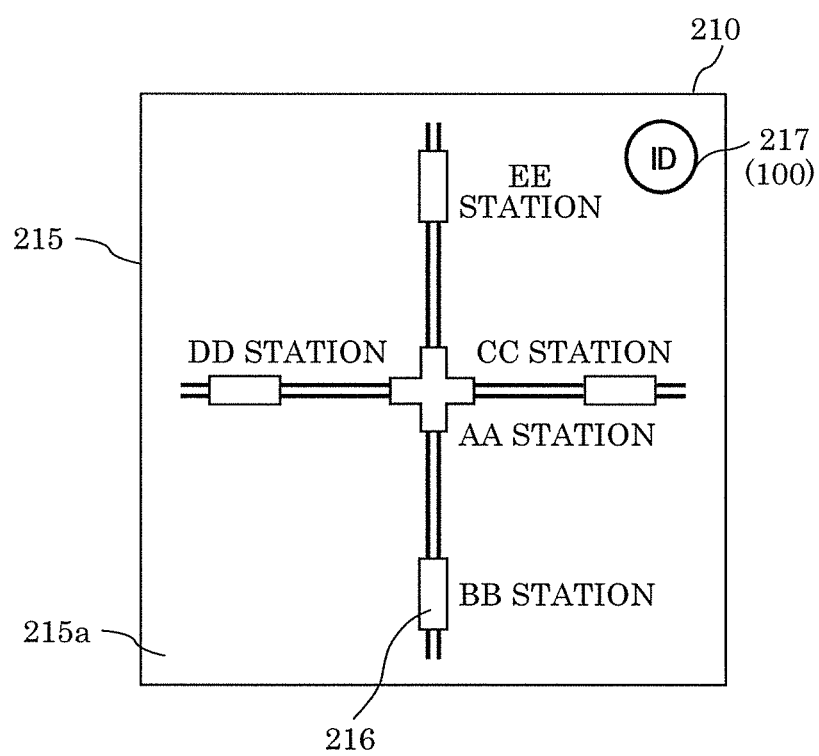
FIG. 8 is an external view of another example of the guidance display device according to the embodiment.

FIG. 8 is an external view of another example of the guidance display device according to the present embodiment.

Guidance display device 210 shown in FIG. 8 includes housing 215, guidance display 216, and mark 217. Guidance display 216 is provided on surface 215*a* of housing 215. Although not shown, guidance display device 210 also includes at least light source 11, controller 12, and storage 13.

Guidance display device 210 includes guidance display 216 only on one surface of housing 215. Stated differently, there is no guidance display on any other surface of guidance display device 210, including a surface opposite surface 215*a*.

In this case, for example, mark 100 illustrated in FIG. 6A is used as mark 217. Alternatively, mark 150 illustrated in FIG. 7A may be used as mark 217. This allows user 2 to guess, by looking at mark 217, that there is not any other guidance display surface.

For example, when user 2 identifies mark 110 illustrated in FIG. 6B, user 2 may be given an impression that a half circle is a portion of a specific graphic. This can thus make user 2 guess that there is another guidance display surface (e.g., second light-exit surface 15*b*) besides guidance display surface (e.g., first light-exit surface 15*a*) which user 2 is looking at. The same applies to mark 120 illustrated in FIG. 6C and the marks illustrated in FIGS. 6D and 7B to 7D.

It should be noted that a direction in which a graphic is segmented and a direction that a guidance display surface is facing may be associated. For example, upward, downward leftward or rightward directions of segmentation may be associated with east, west, south and north, respectively. Specifically, if first light-exit surface 15*a* and second light-exit surface 15b are aligned south to north, the graphic may be segmented into an upper portion and a lower portion.

For example, if first light-exit surface 15a is facing the north, one of marks 120 and 170, which are shaped in upper half circles, may be used as first mark 17a, and if second light-exit surface 15b is facing the south, one of marks 121 and 171, which are shaped in lower half circles, may be used as second mark 17b. Likewise, if first light-exit surface 15a and second light-exit surface 15b are aligned east to west, a graphic is segmented into a left portion and a right portion. For example, if first light-exit surface 15a is facing the east, one of marks 111 and 161, which are right-half portions, may be used as first mark 17a, and if second light-exit surface 15b is facing the west, one of marks 110 and 160, which are left-half portions, may be used as second mark 17b.

Even when guidance display device 10 has four guidance display surfaces corresponding respectively to east, west, south, and north, "east," "west," "south," and "north" may be associated respectively with "right," "left," "bottom," and "top."

It should be noted that the graphic having a specific shape is not limited to be shaped in a circle or rhombus, and may be shaped in a regular polygon. For example, in the case where the total number of light-exit surfaces is N (where N is a natural number of 3 or greater), N triangle segments are formed by equally segmenting a regular N-gon about the centroid. In other words, in the case where the specific graphic is a rotationally symmetric graphic, segmenting the specific graphic into N which is the rotationally symmetric number, thereby forming N congruent segments.

For example, if the graphic having a specific shape is shaped in a circle, the plurality of segments may be sectors into which the graphic is segmented about the centroid at equal angles, the sectors corresponding in number to the total number of light-exit surfaces. This can make the user guess that, for example, the smaller the central angle of the sector is, the greater the total number of guidance display surfaces of the guidance display device is.

Operation (Guidance Method)

Next, operation of guidance system 1 according to the present embodiment, that is, the guidance method is described. The guidance method according to the present embodiment utilizes visible light communications to guide user 2 to a destination.

The guidance method is performed primarily by mobile device 20 and server device 30. It should be noted that guidance display device 10 repeatedly transmits the predetermined information which includes visible light ID 14.

In the following, first, operation of mobile device 20 is described with reference to FIG. 9.

Figure 9:
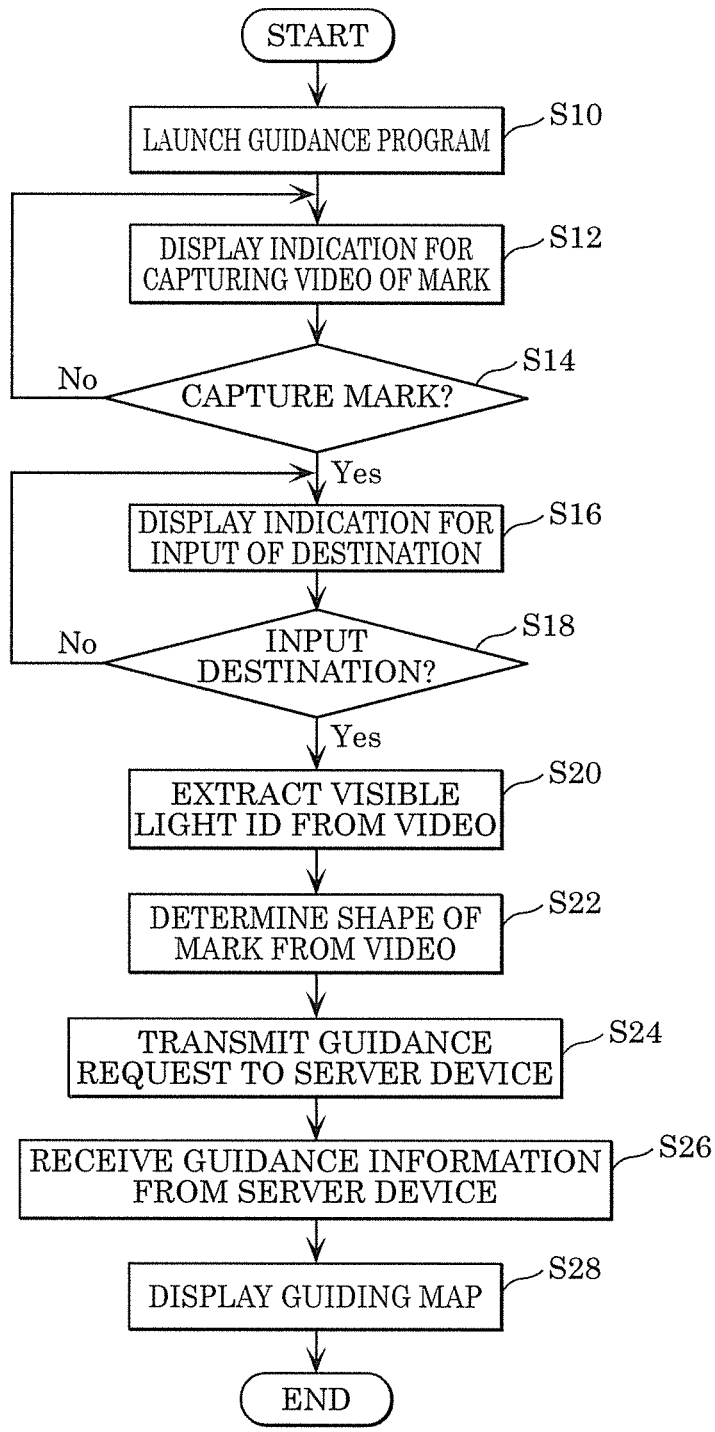
FIG. 9 is a flowchart illustrating operation of a mobile device according to the embodiment.

FIG. 9 is a flowchart illustrating operation of mobile device 20 according to the present embodiment.

First, controller 22 launches the guidance program (S10). For example, if receiver 23 receives an indication for launching the guidance program from user 2, controller 22 loads the guidance program from storage 28 and executes it.

Figure 10:
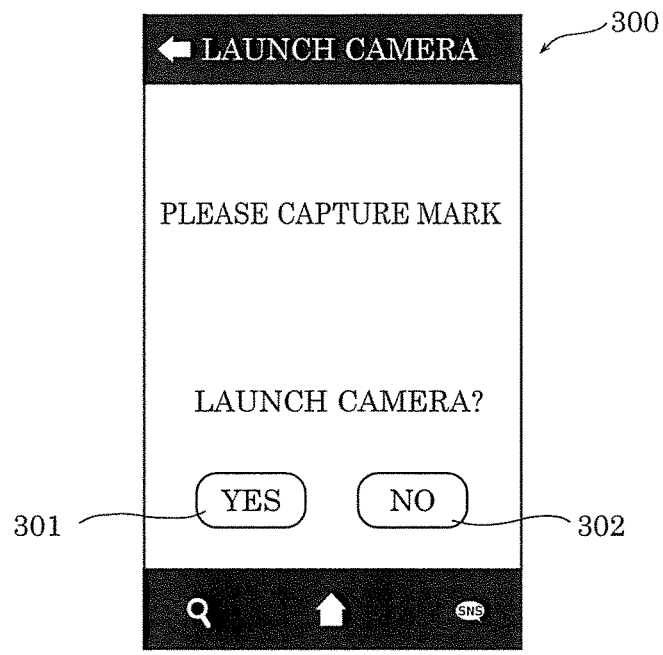
FIG. 10 is a diagram showing a camera launch confirmation screen displayed on a display included in the mobile device according to the embodiment.

Next, controller 22 causes display 27 to display an indication for capturing a video of a mark (S12). FIG. 10 is a diagram showing camera launch confirmation screen 300 displayed on display 27 included in mobile device 20 according to the present embodiment. Display 27 displays camera launch confirmation screen 300, thereby prompting user 2 to capture a video of a mark.

For example, camera launch confirmation screen 300 includes launch button 301. If receiver 23 detects that user 2 has depressed launch button 301, controller 22 launches capturer 21. It should be noted that camera launch confirmation screen 300 also includes end button 302. If receiver 23 detects that user 2 has depressed end button 302, controller 22 ends the guidance program.

Figure 11:
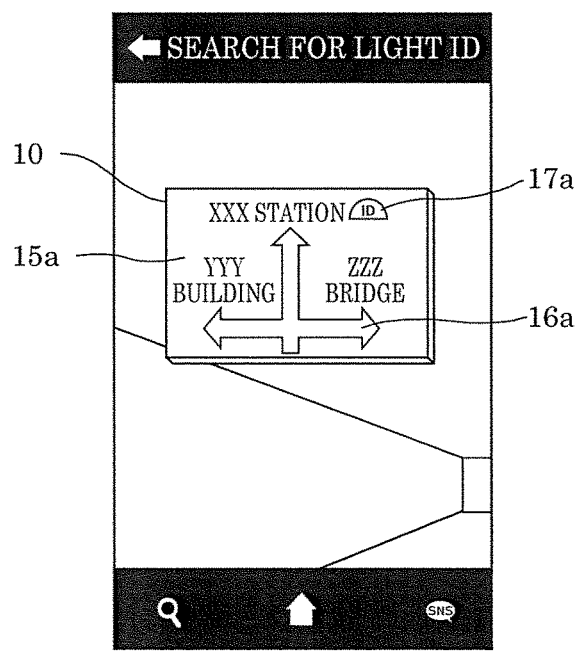
FIG. 11 is a diagram showing a video captured by a capturer and displayed on the display included in the mobile device according to the embodiment.

FIG. 11 is a diagram showing a video captured by capturer 21 and displayed on display 27 included in mobile device 20 according to the present embodiment. User 2 capturing a video of first guidance display 16a on guidance display device 10 allows controller 22 to obtain, as shown in FIG. 11, an image containing first mark 17a and light emitting from first light-exit surface 15a. It should be noted that if user 2 does not capture a video of a mark (No in S14), the processing returns to step S12 and controller 22 continues to display camera launch confirmation screen 300.

Figure 12:
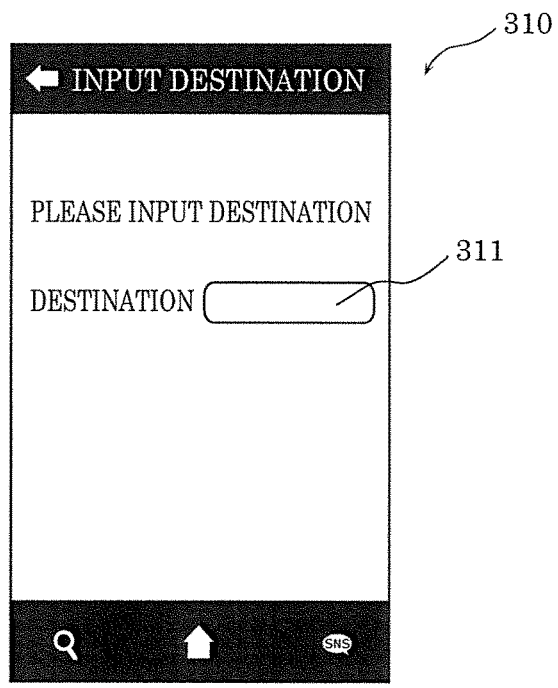
FIG. 12 is a diagram showing a destination input screen displayed on the display included in the mobile device according to the embodiment.

If user 2 captures a video of a mark (Yes in S14), controller 22 causes display 27 to display an indication for input of a destination (S16). FIG. 12 is a diagram showing destination input screen 310 displayed on display 27 included in mobile device 20 according to the present embodiment.

Destination input screen 310 includes text box 311. User 2 inputs a destination to text box 311, using a software keyboard, audio input means, or the like. If user 2 does not input a destination (No in S18), the processing returns to step S16 and controller 22 continues to display destination input screen 310.

If user 2 inputs a destination (Yes in S18), controller 22 extracts a visible light ID from video data (light signal) captured by capturer 21 (S20). Next, controller 22 determines a shape of the mark from the video (S22). For example, controller 22 determines a shape and orientation of the mark by extracting one frame image from the video and performing an image recognition process such as edge detection on the image. The visible light ID and the design information indicating the determination result are, for example, temporary stored into storage 28.

Next, controller 22 transmits a guidance request to server device 30 via communications circuit 24 (S24). The guidance request includes the visible light ID and the design information which is the determination result.

Next, controller 22 receives guidance information from server device 30 via communications circuit 24 (S26). The guidance information includes a map which includes at least a portion of a route from the current location to the destination.

Figure 13:
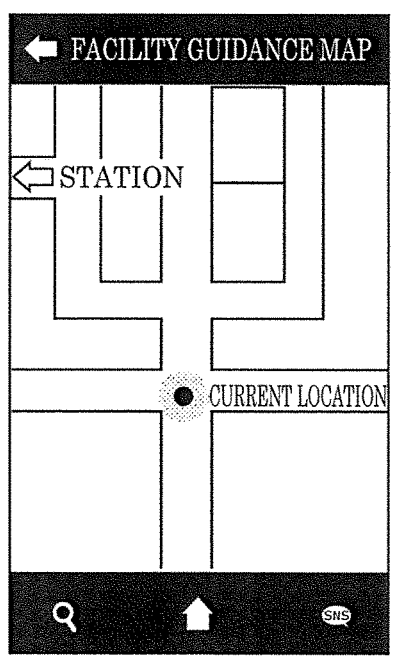
FIG. 13 is a diagram depicting a map (guidance information) displayed on the display included in the mobile device according to the embodiment.

Next, controller 22 causes display 27 to display a guidance map (guiding map) (S28). FIG. 13 is a diagram depicting the map (guidance information) displayed on display 27 included in mobile device 20 according to the present embodiment.

The map displayed on display 27 is, for example, a heading-up display where the direction that user 2 is facing is displayed top of the map and the current location of user 2 is substantially centered. The map indicates a direction to the destination ("STATION" in the example depicted in FIG. 13) by an open arrow.

It should be noted that the guidance information may include audio data instead of or in addition to the map. In this case, controller 22 may cause audio output 26 to output the audio data included in the guidance information.

Next, operation of server device 30 according to the present embodiment is described with reference to FIG. 14.

Figure 14:
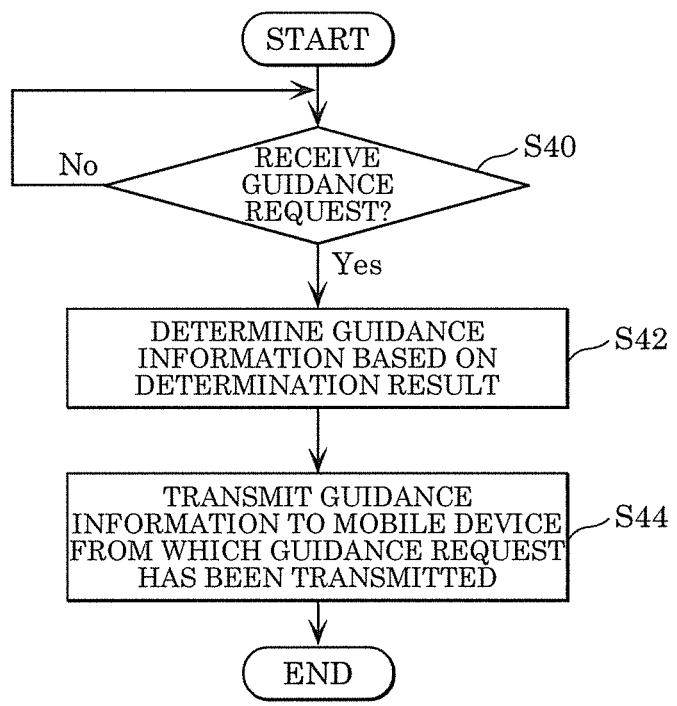
FIG. 14 is a flowchart illustrating operation of a server device according to the embodiment.

FIG. 14 is a flowchart illustrating the operation of server device 30 according to the present embodiment. The operation of server device 30 illustrated in FIG. 14 is performed, for example, after step S24 and before step S26 illustrated in FIG. 9.

First, controller 34 waits to receive a guidance request via communications circuit 33 (No in S40). If communications circuit 33 receives a guidance request (Yes in S40), controller 34 determines guidance information, based on a visible light ID, design information, and destination information included in the guidance request (S42).

Specifically, controller 34 determines a current location of user 2 (mobile device 20), based on the visible light ID and the design information. In the present embodiment, controller 34 selects a location and a direction that are corresponding to the visible light ID and the design information included in the guidance request, by reference to correspondence table 32 stored in storage 31. For example, in the example shown in FIG. 11 where first mark 17a is shaped in an upper half circle, if the visible light ID is "VL001", controller 34 knows, by reference to correspondence table 32 illustrated in FIG. 8, that the current location of user 2 is "UNDERGROUND MALL 001" and user 2 is facing the "NORTH." Thus, controller 34 generates a north-up map where "UNDERGROUND MALL 001" is centered.

Moreover, controller 34 displays on the map a destination indicated by the destination information included in the guidance request. If the destination is outside a display range of the map, the direction to the destination may be indicated by an arrow, as depicted in FIG. 13, for example.

Next, controller 34 transmits, via communications circuit 33, the guidance information to mobile device 20 from which controller 34 has received the guidance request (S44). This displays the map as depicted in FIG. 13, on display 27 included in mobile device 20.

Effects

As described above, guidance display device 10 according to the present embodiment transmits predetermined information by visible light communications, guidance display device 10 including: light source 11 which emits light for visible light communications, the light including the predetermined information; housing 15 covering light source 11 and having first light-exit surface 15a which transmits the light emitted by light source 11; first guidance display 16a on first light-exit surface 15a; and first mark 17a on first light-exit surface 15a, wherein first mark 17a has a shape corresponding to a total number of light-exit surfaces, including the first light-exit surface, of guidance display device 10 through which the light for visible light communications emitted by the light source exits.

This provides first mark 17a on first light-exit surface 15a of first guidance display 16a, thereby allowing user 2 to know, by visually identifying first mark 17a, that guidance display device 10 is the source of the light for visible light communications. Stated differently, for example, by utilizing mobile device 20 to receive the light from guidance display device 10, user 2 can, for example, obtain the current location by the visible light communications.

Moreover, for example, first mark 17a may be utilized to determine a direction that user 2 is facing. For example, by making user 2 capture a video of first mark 17a, guidance display device 10 is able to know at least that user 2 is present in a direction in which user 2 can capture the video of first mark 17a. Thus, guidance display device 10 can inform user 2 of not only the current location by the visible light communications but also an approximate direction that user 2 is facing by determining the mark.

In this manner, guidance display device 10 allows user 2 to know the current location and an approximate direction that user 2 is facing, thereby properly guiding user 2.

Moreover, since the shape of first mark 17a corresponds to the total number of light-exit surfaces of guidance display device 10, user 2 is able to guess the total number of light-exit surfaces (guidance display surfaces) from the shape of the mark. This can implicitly inform user 2 of, for example, presence of a plurality of guidance displays, thereby prompting user 2 to look at the plurality of guidance displays.

A global positioning system (GPS) is known as a system to inform user 2 of his/her current location. However, radio waves from a GPS satellite may not reach indoors such as underground malls, or even outdoors such as areas surrounded by high-rise buildings. In such cases, the current location can be informed to user 2 by making use of visible light communications as guidance display device 10 according to the present embodiment. Moreover, since the communication range of visible light communications is limited to a visible-light range, the current location can be measured more accurately than GPS.

Moreover, for example, housing 15 further has second light-exit surface 15b which transmits the light from light source 11, guidance display device 10 further including: second guidance display 16b on second light-exit surface 15b; and second mark 17b on second light-exit surface 15b, wherein second mark 17b has a shape corresponding to the total number of light-exit surfaces, further including the second light-exit surface, of guidance display device 10 through which the light for visible light communications emitted by the light source exits.

This allows not only first mark 17a but also second mark 17b to be utilized to determine a direction that user 2 is facing. In other words, for example, by making user 2 capture a video of first mark 17a or second mark 17b, guidance display device 10 is able to know at least that user 2 is present in a direction in which user 2 can capture a video of either one of first mark 17a and second mark 17b. Thus, guidance display device 10 knows the current location of user 2 and an approximate direction that user 2 is facing, thereby properly guiding user 2.

Moreover, for example, the shape of first mark 17a and the shape of second mark 17b are identical and an orientation of first mark 17a and an orientation of second mark 17b are different.

According to this, first mark 17a and second mark 17b have different orientations, and thus guidance display device 10 is able to know which one of first light-exit surface 15a and second light-exit surface 15b user 2 is looking at, based on an orientation of a mark. In other words, guidance display device 10 can more accurately know a direction in which user 2 is present, from the shape and orientation of the mark. Thus, guidance display device 10 accurately knows the current location of user 2 and its direction, thereby properly guiding user 2.

Moreover, for example, the shape and the orientation of first mark 17a correspond to a shape and an orientation of a first segment among a plurality of segments into which a graphic having a specific shape is segmented, and the shape and the orientation of second mark 17b correspond to a shape and an orientation of a second segment among the plurality of segments.

According to this, the shapes of segments into which a graphic having a specific shape is segmented is utilized as shapes of marks, thereby allowing user 2 to guess, by visually identifying a shape of a mark, presence or absence or the number of the rest of guidance displays. As a result, guidance display device 10 is able to prompt user 2 to identify a great number of guidance displays, thereby helping user 2 understand the current location and the direction that user 2 is facing.

Moreover, for example, the graphic is shaped in either one of a circle and a rhombus, and the plurality of segments are shaped in either one of half circles and two triangles into which the graphic is equally segmented either vertically or horizontally.

Moreover, for example, the graphic is shaped in either one of a circle and a rhombus, and the plurality of segments are shaped in either one of quarter circles and four triangles into which the graphic is equally segmented about a centroid.

Moreover, for example, the graphic is shaped in a circle, and the plurality of segments are sectors into which the graphic is segmented about a centroid at equal angles, the sectors corresponding in number to the total number of light-exit surfaces.

This allows user 2 to guess, from the shape of a mark, the total number of segmentations, that is, the total number of guidance display surfaces. As a result, guidance display device 10 is able to prompt user 2 to identify a great number of guidance displays, thereby helping user 2 understand the current location and the direction that user 2 is facing.

Moreover, for example, guidance system 1 according to the present embodiment includes guidance display device 10 and mobile device 20, mobile device 20 including: capturer 21 which obtains an image containing first mark 17a and receives the light for visible light communications, by capturing a video of first light-exit surface 15a; controller 22 which extracts the predetermined information from the light received by capturer 21, and generates design information based on the shape of first mark 17a from the image; receiver 23 which receives input of a destination from user 2; communications circuit 24 which transmits to server device 30 a guidance request which includes the predetermined information, the design information, and destination information indicative of the destination, and receives guidance information from server device 30 as a response to the guidance request, the guidance information being information for guiding user 2 to the destination; and output 25 which outputs the guidance information.

This allows guidance system 1 to obtain a current location of user 2 (mobile device 20) based on the information extracted from the light for visible light communications, and obtain a direction that user 2 is facing from the shape of first mark 17a. Thus, guidance system 1 can present, to user 2, accurate guidance information taking into account not only the current location of user 2 but also the direction that user 2 is facing, thereby properly guiding user 2.

Moreover, for example, controller 22 determines the shape of first mark 17a by performing an image recognition process on the image, and generates a determination result as the design information.

This allows guidance system 1 to readily determine a shape of first mark 17a by the image recognition process, thereby readily obtaining a direction that user 2 is facing.

Moreover, for example, guidance system 1 further includes server device 30 including: storage 31 storing correspondence table 32 in which the predetermined information, a location of guidance display device 10, the shape of first mark 17a, and a direction that first light-exit surface 15a is facing are associated, communications circuit 33 which receives the guidance request; and controller 34 which determines, by reference to correspondence table 32, a current location of mobile device 20, from the predetermined information and the design information included in the guidance request, and generates, as the guidance information, information indicating a route from the current location to the destination indicated by the destination information, wherein communications circuit 33 further transmits the guidance information to mobile device 20.

According to this, server device 30 generates the guidance information, thereby achieving a reduction in processing load on mobile device 20. Specifically, mobile device 20 only needs to communicate with server device 30. Moreover, since server device 30, typically, has higher throughput than mobile device 20, the guidance information can quickly be provided to user 2 by causing server device 30 to perform processing that causes high load, such as the reference to correspondence table 32 and the generation of the guidance information.

Moreover, for example, the guidance information includes a map which shows at least a portion of a route from a current location of mobile device 20 to the destination, and output 25 includes display 27 which displays the map.

This allows the route to the destination to be provided to user 2 in a visually clear manner by causing display 27 included in mobile device 20 to display the map.

Moreover, for example, the guidance method according to the present embodiment is performed using guidance display device 10, the guidance method including: obtaining an image containing first mark 17a and receiving the light for visible light communications, by capturing a video of first light-exit surface 15a; extracting the predetermined information from the light; generating design information based on the shape of first mark 17a from the image; receiving input of a destination from user 2; determining a current location of user 2, based on the predetermined information and the design information; generating guidance information which indicates a route from the current location to the destination; and outputting the guidance information.

This allows a current location of user 2 (mobile device 20) to be obtained based on the information extracted from the light for visible light communications, and a direction that user 2 is facing to be obtained from the shape of first mark 17a. Thus, accurate guidance information that takes into account not only the current location of user 2 but also the direction that user 2 is facing can be presented to user 2, thereby properly guiding user 2.

It should be noted that the predetermined information may be information that is predetermined and supplied by server device 30 to guidance display device 10. Stated differently, server device 30 may manage identification information of a plurality of guidance display devices 10.

This allows the management of identification information to be centralized to server device 30, thereby facilitating incorporation of guidance display device 10 into guidance system 1, for example.

Other Embodiments

While the guidance display device, the guidance system, and the guidance method according to the present disclosure have been described above, with reference to the embodiment above, the present disclosure is not limited to the above embodiment.

For example, while the embodiment has been described with reference to the marks made on two or more guidance display surfaces, where the marks are congruent and form, in combination, a rotationally symmetric graphic such as a circle or a rhombus, the present disclosure is not limited thereto. The plurality of marks may have different shapes.

For example, first mark 17a and second mark 17b may have different shapes. For example, first mark 17a and second mark 17b may be segments into which a graphic having a specific shape is segmented unequally. For example, first mark 17a may be shaped in a quarter circle, and second mark 17b may be shaped in a three-quarter circle.

Alternatively, the marks are not limited to the segments of a graphic having a specific shape. The marks may be different from one another and have shapes that remind user 2 of a predefined set of shapes. For example, the symbols used in playing cards have shapes that correspond to a predefined set of shapes (spades, diamonds, clubs, hearts), and they may be used as marks on four guidance display surfaces.

Moreover, for example, while the embodiment has been described with reference to the light for visible light communications which exits housing 15 from the entirety of first light-exit surface 15a, the present disclosure is not limited thereto. For example, the light for visible light communications may exit housing 15 only from first mark 17a or only from first guidance display 16a.

Moreover, for example, the above embodiment has been described with reference to first light-exit surface 15a and second light-exit surface 15b being opposing surfaces, the present disclosure is not limited thereto. For example, guidance display device 10 may be provided at a right angled corner, and first light-exit surface 15a and second light-exit surface 15b may be surfaces perpendicular to each other.

Moreover, for example, in the above embodiment, capturer 21 includes the image sensor, and captures a video of a mark and receives light for visible light communications simultaneously, the present disclosure is not limited thereto. For example, mobile device 20 may include a photo diode besides the image sensor, and the photo diode may receive the light for visible light communications.

For example, while the above embodiment has been described with reference to mobile device 20 obtaining the guidance information by communication with server device 30, the present disclosure is not limited thereto. For example, mobile device 20 may pre-store correspondence table 32 in storage 28. This allows mobile device 20 to read and refer to correspondence table 32 from storage 28, without communicating with server device 30, to obtain the current location. In other words, guidance system 1 may not include server device 30.

The components according to the above embodiment may be implemented in a form of dedicated hardware. Alternatively, the components may be implemented through execution of a software program suited for each component. Each component may be implemented by a program execution unit, such as central processing unit (CPU) or processor, loading and executing the software program stored in a storage medium such as a hard disk or a semiconductor memory.

It should be noted that the present disclosure can be implemented not only in the guidance display device or the guidance system but also in a program which includes as steps the processes performed by the components included in the guidance display device or the guidance system, and in a computer-readable storage medium storing the program, such as a digital versatile disc (DVD).

In other words, the general or specific aspects of the present disclosure described above may be implemented in a system, apparatus, integrated circuit, computer program, or computer-readable storage medium, or may be implemented in any combination of the system, apparatus, integrated circuit, computer program, and storage medium.

In other instances, various modifications to the exemplary embodiment according to the present disclosure described above that may be conceived by a person skilled in the art and embodiments implemented in any combination of the components and functions shown in the exemplary embodiment are also included within the scope of the present disclosure, without departing from the spirit of the present disclosure.

What is claimed is:

1. A guidance display device which transmits predetermined information by visible light communications, the guidance display device comprising:
    a light source which emits light for visible light communications, the light including the predetermined information;
    a housing covering the light source and having a first light-exit surface which transmits the light emitted by the light source;
    a first guidance display on the first light-exit surface; and
    a first mark on the first light-exit surface, wherein
    the first mark has a shape corresponding to a total number of light-exit surfaces, including the first light-exit surface, of the guidance display device through which the light for visible light communications emitted by the light source exits.

2. The guidance display device according to claim 1, wherein
    the housing further has a second light-exit surface which transmits the light emitted by the light source,
    the guidance display device further comprising:
    a second guidance display on the second light-exit surface; and
    a second mark on the second light-exit surface, wherein
    the second mark has a shape corresponding to the total number of light-exit surfaces, further including the second light-exit surface, of the guidance display device through which the light for visible light communications emitted by the light source exits.

3. The guidance display device according to claim 2, wherein
    the shape of the first mark and the shape of the second mark are different.

4. The guidance display device according to claim 2, wherein
    the shape of the first mark and the shape of the second mark are identical and an orientation of the first mark and an orientation of the second mark are different.

5. The guidance display device according to claim 4, wherein
    the shape and the orientation of the first mark correspond to a shape and an orientation of a first segment among a plurality of segments into which a graphic having a specific shape is segmented, and
    the shape and the orientation of the second mark correspond to a shape and an orientation of a second segment among the plurality of segments.

6. The guidance display device according to claim 5, wherein
    the graphic is shaped in either one of a circle and a rhombus, and
    the plurality of segments are shaped in either one of half circles and two triangles into which the graphic is equally segmented either vertically or horizontally.

7. The guidance display device according to claim 5, wherein
    the graphic is shaped in either one of a circle and a rhombus, and the plurality of segments are shaped in either one of quarter circles and four triangles into which the graphic is equally segmented about a centroid.

8. The guidance display device according to claim 5, wherein
the graphic is shaped in a circle, and
the plurality of segments are sectors into which the graphic is segmented about a centroid at equal angles, the sectors corresponding in number to the total number of light-exit surfaces.

9. A guidance system comprising the guidance display device according to claim 1 and a mobile device,
the mobile device including:
a capturer which obtains an image containing the first mark and receives the light for visible light communications, by capturing a video of the first light-exit surface;
a first controller which extracts the predetermined information from the light received by the capturer, and generates design information based on the shape of the first mark from the image;
a receiver which receives input of a destination from a user;
a first communications circuit which transmits to a server device a guidance request which includes the predetermined information, the design information, and destination information indicative of the destination, and receives guidance information from the server device as a response to the guidance request, the guidance information being information for guiding the user to the destination; and
an output which outputs the guidance information.

10. The guidance system according to claim 9, wherein the first controller determines the shape of the first mark by performing an image recognition process on the image, and generates a determination result as the design information.

11. The guidance system according to claim 9, further comprising
the server device including:
a storage storing a correspondence table in which the predetermined information, a location of the guidance display device, the shape of the first mark, and a direction that the first light-exit surface is facing are associated,
a second communications circuit which receives the guidance request; and
a second controller which determines, by reference to the correspondence table, a current location of the mobile device from the predetermined information and the design information included in the guidance request, and generates, as the guidance information, information indicating a route from the current location to the destination indicated by the destination information, wherein
the second communications circuit further transmits the guidance information to the mobile device.

12. The guidance system according to claim 9, wherein the predetermined information is predetermined and supplied by the server device to the guidance display device.

13. The guidance system according to claim 9, wherein the guidance information includes a map which shows at least a portion of a route from a current location of the mobile device to the destination, and
the output includes a display which displays the map.

14. A guidance method performed using the guidance display device according to claim 1, the guidance method comprising:
obtaining an image containing the first mark and receiving the light for visible light communications, by capturing a video of the first light-exit surface;
extracting the predetermined information from the light;
generating design information based on the shape of the first mark from the image;
receiving input of a destination from a user;
determining a current location of the user, based on the predetermined information and the design information;
generating guidance information which indicates a route from the current location to the destination; and
outputting the guidance information.

* * * * *